M. G. Crane.
File-Cutting Machine.

Nº 46,780. Patented Mar. 14, 1865.

Witnesses:
Francis Gould
W. B. Gleason

Inventor:
Moses G. Crane
by his Atty
J. B. Crosby

UNITED STATES PATENT OFFICE.

MOSES G. CRANE, OF BOSTON, MASSACHUSETTS.

FILE-CUTTING MACHINE.

Specification forming part of Letters Patent No. 46,780, dated March 14, 1865.

*To all whom it may concern:*

Be it known that I, MOSES G. CRANE, of Boston, in the county of Suffolk, State of Massachusetts, have invented an Improved File-Cutting Machine; and I do hereby declare that the following, taken in connection with the drawings which accompany and form part of this specification, is a description of my invention, sufficient to enable those skilled in the art to practice it.

Figure 1:
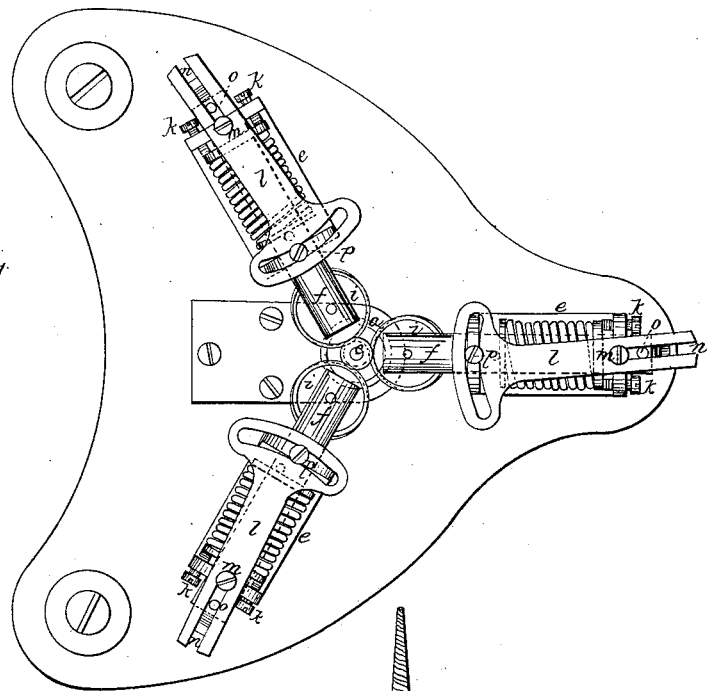
Figure 2:
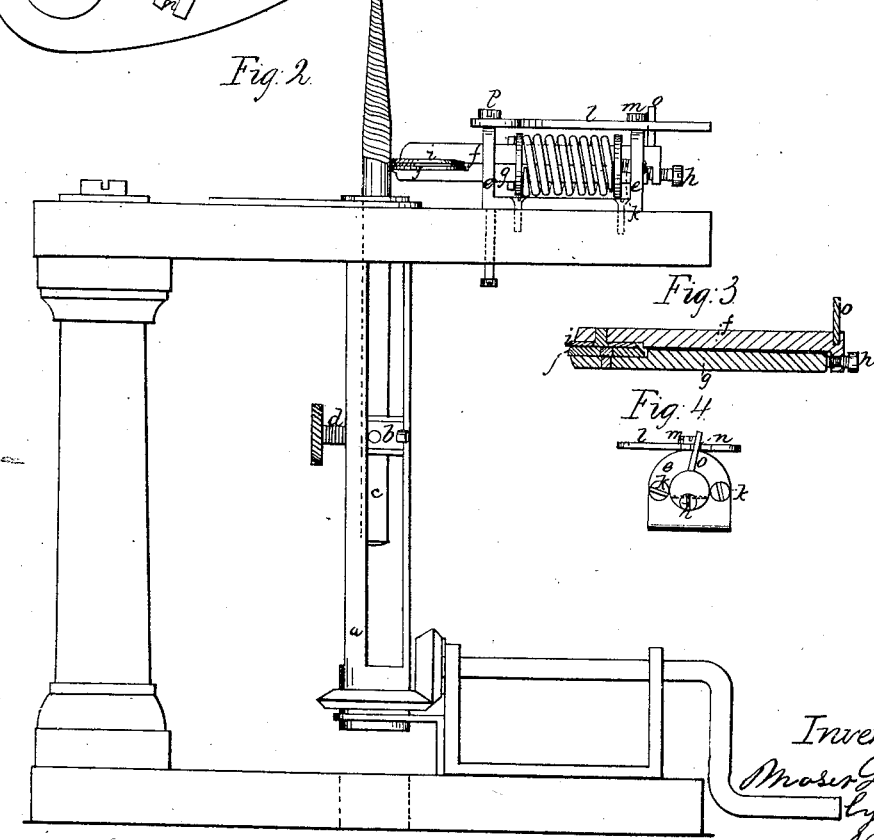
Figure 3:
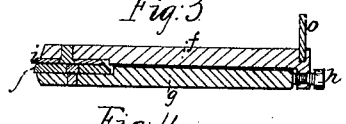
Figure 4:
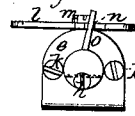

Of said drawings, Figure 1 is a plan of a machine embodying my invention, and arranged for cutting files of a circular or of a generally curvilinear cross-section. Fig. 2 is a side elevation of said machine, with two of the three cutter-bearers shown in Fig. 1 removed. Fig. 3 shows one of the cutters and its gage, together with the parts immediately therewith connected, all in section; and Fig. 4 is an end view of one of the cutter and gage bearers.

My invention consists in a file-cutting machine so organized that by angular adjustment of the cutters relative to the axis of the file when in position to be cut, and by rotation of the file, or by the rotation of the cutters around the file, a continuous thread or threads, forming the teeth of the file, shall be formed on the file-blank, passing around it in a spiral direction or in the manner of a screw-thread.

In the organization of a machine to embrace my invention, I prefer to rotate the file-blank, as being much simpler than rotation of the cutters around the blank. Either of said rotations with the angular arrangement of the cutters effects automatic longitudinal motion of the file-blank, though the organization might be such as to allow the file-blank to remain at rest as to movement in direction of its length, in which case the cutter would move along the length of the file.

My invention further consists in the employment, in connection with a cutter, of a gage so arranged relatively to said cutter as to bear on the uncut surface of the file-blank, and thus regulate the depth of the cut, and so that while performing said function sufficient space is given between the cutter and the gage for the reception of the burr or tooth raised by the action of the cutter.

My invention further consists in making said gage adjustable relative to the edge of the cutter, also, in making the angle of the cutter adjustable with respect to the axis of the file-bank; and, furthermore, in certain details of construction, which will be referred to beyond.

The machine shown in the drawings is one which is arranged for cutting round taper files, the file-blank being made to rotate and the cutters being fixed, except with respect to independent rotation of each on its own axis and movement toward and from the axis of the file-blank.

The frame-work of the machine and the gearing by which the file-blank is rotated are easily enough understood from the drawings. Said gearing rotates a slotted sleeve, *a*, within which is a chuck, *b*, in which the file-blank *c* is held by a set-screw, *d*, the chuck *b* being made to slide freely up and down in the sleeve *a*, but prevented from turning therein. Then the file-blank is made to rotate while it is free to move longitudinally.

On the top plate of the machine, and arranged around the center of the sleeve *a*, are supports *e*, for the tooth-forming mechanism. Each support has cylindrical bearings therein, which receive a cylindrical spindle made up of two parts, an upper part, *f*, and a lower part, *g*, which, while they must turn together and must move back and forth together, are yet adjustable in a longitudinal direction with respect to each other by means of the set-screws *h*.

The upper half of the spindle has pivoted thereunto the cutter *i*, and the lower half the gage *j*, both being disk-like pieces, the former of steel suitably sharpened and tempered. The gage is beveled, as shown, to clear the burr or tooth thrown up by the action of the cutter; or it may be set a little distance off from the cutter. Coiled around *f* and *g*, and between washers placed thereupon, the washer nearest the file bearing on pins, one in the upper and one in the lower part of the spindle, is a stout spiral spring, which acts always to force forward the cutter and gage toward the file. The amount of pressure which the spring is made to exert is regulated by adjustment of the set-screws *k*, care being taken, in order to secure uniformity of cut, that the pressure is sufficient to bring the gage in contact with the uncut surface of the file-blank, even in the hardest places which may exist therein. It will be obvious that the position of the gage relative to the cutter-edge determines the height or depth of the cut, which must be uniform from one end of the file to the other, unless the relative positions of the gage and cutter are changed, which may be done during the cutting of a file, if, as is sometimes the case, it is desirable to make the file-teeth deeper at the middle of a file than they are at the heel or point.

To give any desired angle of the cutter to the axis of the tube *a*, a T-shaped lever, *l*, is pivoted to the support *e* at *m*. In this lever are two slots at about right angles to each other, one slot, *n*, embracing a pin, *o*, which is fixed in and projects from *f*. Now, by inspection of Fig. 1 it will be seen that as the lever *l* is swung one side or the other the spindle *f g* must be turned thereby to a greater or less extent, according to the amount of sidewise movement of the lever *l*, and, furthermore, that it is by this partial rotation of said spindle that the cutter is set and adjusted to any needed angle, the set-screw *p* confining the lever wherever needed.

Any suitable number of cutting mechanisms, substantially similar to that just described, may be arranged around a common center. On reference to Fig. 1 three will there be seen, which, pressing toward a common center, form beds, each of which receives the pressure from the other, and hold the file-blank submitted to the action centrally between them, thus doing away with the need of soft-metal beds or supports.

An organization by which the stress exerted by one rotary cutter on a file-blank is counteracted by stress exerted in an opposite direction by another or other rotary disk-cutters constitutes another part of my invention. By it I am enabled to be cutting on the same blank at two or more places at the same time, or to use several cutters for increasing the size of one gash or cut, using all the time as a fixed and unchangeable gage the uncut surface of the blank, which is the only gage which can be successfully used with any certainty of securing teeth of a uniform or of a desired depth in file-cutting. To the angular set of the cutters is due the longitudinal progression of the file-blank while rotating, this being effected in the same manner and for the same reasons that a rod moves longitudinally through a screw-die while the latter is rotated and kept from any other movement.

It is an advantage in taper files to have the teeth at the small end finer than at the middle or large part of the file. This the detail of construction shown in the drawings, especially in Fig. 1, effects, for it must be obvious from inspection of said figure that the nearer each cutter approaches the common center the less will be the angle given the cutter from the position of the pin *o* in the slot *n*; and it will be understood that the less the angle of the cutter the less will be the advance of the file and the finer will be the teeth, and vice versa. In files which are formed from heel to point of equal diameter, if it is desired to have the teeth cut finer at either or both ends than in the middle, means may be applied to the spindles *f g* to turn them automatically or by hand so as to change the angle of the cutters. As it is considered by some mechanicians that too great regularity in the spacing of the teeth is apt to produce a vibrating or chattering action of the file, the spacing of the teeth may be made as irregular as is needed by changing the angles of the cutters.

Part of my invention consists in the means described for changing the angle or pitch of the file-teeth; also, in the means described or in any equivalents therefor which operate to change the angle of the cutter from any pitch to a less pitch or from any pitch to a greater pitch, so as to make the teeth finer upon the small diameters of a file than they are on its large diameter.

My invention further consists in the manufacture of files which have their teeth formed by cuts in a spiral direction, like the threads of a screw, except that the teeth are burrs formed by displacement of material, and are not, like screw-threads, formed either by removal or by addition of material.

If but a single cutter is used, then there should be one or more pressure-rolls arranged opposite to receive the stress of the cutting; but this, on account of needlessly slow working, should never be done in practice. The screw which is formed around the file will be single, double, triple, quadruple, and so on, according to the number of cutters employed and their adjustment. To adjust the cutters so as to have each form a separate thread and so as to have them all a proper distance apart, the carriages *e* can be adjusted in height by the screws shown in dotted lines in Fig. 2. When the screw thread or threads have a regular gain or pitch from one to the other end of a file, the throwing up of the burr or burrs which form the thread or threads may be increased, if desired, by giving to the file-blank a regular positive progression very slightly in excess of what the file would receive from the operation of the inclined cutters.

In connection with each cutter and gage bearing spindle there should be some convenient system of levers to draw back the cutters and gages from each file, to release it when cut, and in some cases to enter uncut blanks between the cutters. No such arrangement is shown in the drawings, because it would only complicate and confuse them, and it is obvious that any competent mechanic could without invention make such an obvious appliance.

It will be seen that by the mechanism described several "half-round files," technically so called, can be cut by making the machine of sufficient size and employing a suitable polygonal spindle, to which the files are secured with their flat faces against the faces of the spindle.

So far as described, the files cut by my machine are float or single cut; but it is plain that when cut one way they may be cross-cut in another similar machine, in which the angle of the cutters is reversed, and in which the gages are made of material which, bearing on the previously-cut teeth, will not harm them. By uniformity of cut, which I make, and the fact that the teeth are not short cuts, which, being on a curved surface, are necessarily highest in the middle of each little cut, I produce very cheaply a superior file, the need for which is evinced by the production of such files as those described in Thomlinson's Cyclopedia, Vol. 1, f. 642, as Robinson's Curvilinear File.

To operate the mechanism herein described as embodying my invention, the cutters are first drawn back and a file-blank is introduced into the tube $a$, and is secured by its tang in the chuck $b$, which is then brought upward till that part of the file where the cutting is to begin is placed opposite to the cutters, which are released from control and bear upon the blank. Rotation now of the crank in the proper direction will cause the file-blank to turn so as to advance by the contact therewith of the cutters, these rotating as the file-blank rotates. When the body of the file-blank is cut as near to the tang as desirable, rotation is stopped, the cutters are drawn back, and the cut blank is released from the chuck, which is then in readiness to receive a new blank, on which the described operation is to be repeated.

Before my invention files round or curvilinear in cross-section have sometimes been made with teeth cut continuously and spirally around their surfaces, from end to end, the teeth being formed by removal of the material of the blank. Such, however, is not the operation or purpose of my invention, and constitutes no part of it, the teeth of my files being formed spirally and continuously around the blank by displacement, and not by removal of the material thereof.

I claim—

1. The manufacture of curvilinear-surfaced files with teeth which have the direction of screw-threads when these are thrown up as burrs from the surface of the file blanks, and continuously and spirally around the same, to substantially a uniform distance therefrom.

2. In a file-cutting machine, the combination and arrangement of mechanism substantially as described.

3. The employment, in connection with a file-blank cutter, of a gage in such manner as to regulate the depth of the cut by contact with the uncut surface of the blank, and so as not to interfere with the burr or tooth raised by the cut, substantially as and for the purpose described.

4. Making such gage adjustable with respect to the edge of the cutter, substantially as and for the purpose specified.

MOSES G. CRANE.

Witnesses:
   J. B. CROSBY,
   FRANCIS GOULD.